(12) United States Patent
Saikawa

(10) Patent No.: US 9,776,434 B2
(45) Date of Patent: Oct. 3, 2017

(54) CONTROL METHOD OF AN INKJET PRINTER, AND INKJET PRINTER

(71) Applicant: Seiko Epson Corporation, Tokyo (JP)

(72) Inventor: Takashi Saikawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/255,408

(22) Filed: Sep. 2, 2016

(65) Prior Publication Data

US 2017/0066258 A1    Mar. 9, 2017

(30) Foreign Application Priority Data

Sep. 9, 2015   (JP) .................................. 2015-177321

(51) Int. Cl.
*B41J 11/00* (2006.01)
*B41J 2/01* (2006.01)
*G06K 15/02* (2006.01)

(52) U.S. Cl.
CPC ............. *B41J 11/0085* (2013.01); *B41J 2/01* (2013.01); *G06K 15/18* (2013.01)

(58) Field of Classification Search
CPC ...... B41J 11/0085; B41J 15/04; B41J 11/007; B41J 2/01; B41J 2/16532
See application file for complete search history.

(56) References Cited

U.S. PATENT DOCUMENTS

| | | | |
|---|---|---|---|
| 2010/0149242 A1* | 6/2010 | Takahashi | B41J 2/16585 347/14 |
| 2012/0013669 A1* | 1/2012 | Toya | B41J 11/002 347/16 |
| 2012/0236061 A1 | 9/2012 | Yudasaka et al. | |

FOREIGN PATENT DOCUMENTS

| | | |
|---|---|---|
| JP | 07-206212 A | 8/1995 |
| JP | 2000-190481 A | 7/2000 |
| JP | 2012-192556 A | 10/2012 |

* cited by examiner

*Primary Examiner* — Thinh H Nguyen
(74) *Attorney, Agent, or Firm* — Foley & Lardner LLP

(57) ABSTRACT

An inkjet printer having a platen to which a suction unit is disposed suppresses increasing the time required for printing to end and suppresses unnecessary operation of the suction fan. The inkjet printer 1 receives control data from a host computer 3, and starts operation of the suction fan 26f if a printing-related command instructing rendering image data to be printed by the inkjet head 10 in the image buffer BF is included in the received control data.

12 Claims, 12 Drawing Sheets

DATA START COMMAND — CF
CREATE IMAGE BUFFER COMMAND — C1
RENDER IMAGE DATA COMMAND — C5
PRINT INSTRUCTION COMMAND — CQ
DATA END COMMAND — CE

G81

FIG. 9A
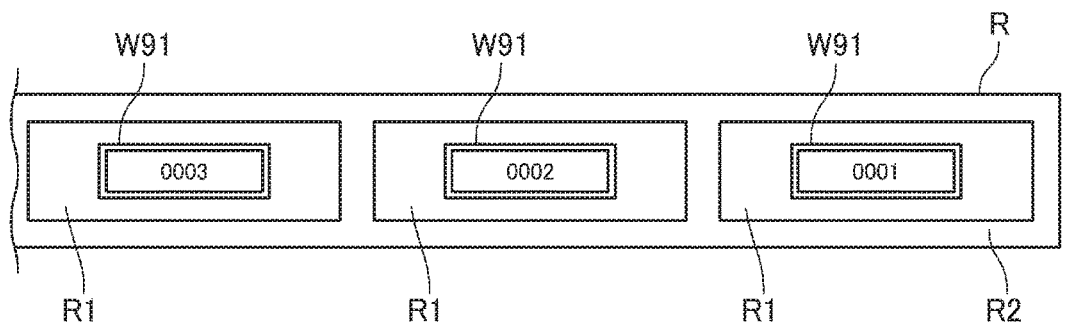
FIG. 9B1
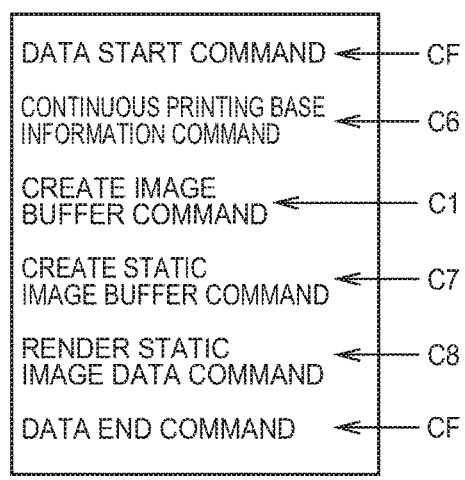
FIG. 9B2
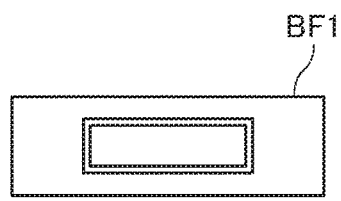
FIG. 9C1
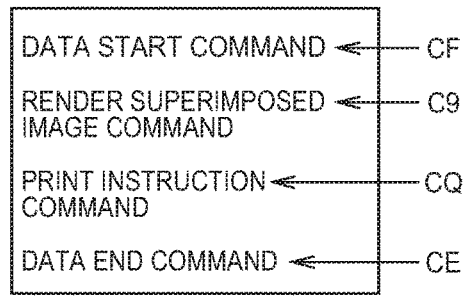
FIG. 9C2
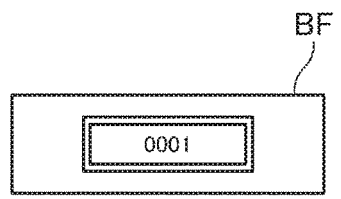

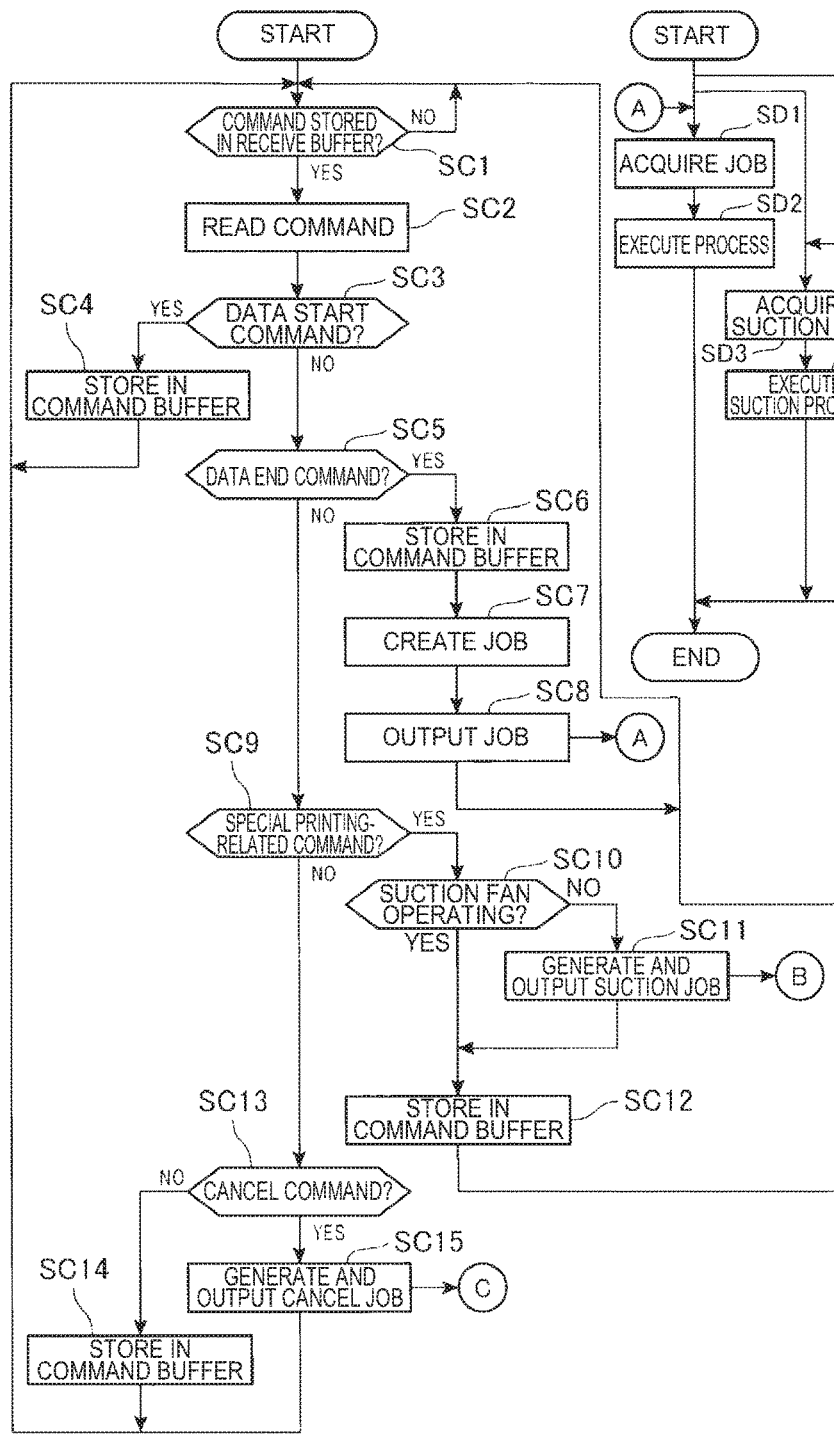

CONTROL METHOD OF AN INKJET PRINTER, AND INKJET PRINTER

BACKGROUND

1. Technical Field

The present invention relates to a control method of an inkjet printer, and an inkjet printer.

2. Related Art

Devices that use a suction fan to suction recording media located on a platen are known from the literature. See, for example, JP-A-H07-206212.

Some inkjet printers having an inkjet head that ejects ink onto a recording medium to form dots and a platen disposed opposite the inkjet head with a gap therebetween also have a suction unit with a suction fan disposed to the platen, and suction the recording medium to the platen by means of the suction unit as described in JP-A-H07-206212 to maintain a desirable distance between the inkjet head and the recording medium on the platen.

When the suction unit operates in an inkjet printer having a suction unit as described above, driving the suction unit produces noise, power is consumed by operating the suction unit, and wear (aging) progresses as the suction unit is driven. Configurations that drive the suction fan once physical operations related to printing start take time for rotation of the suction fan to stabilize after the suction fan starts operating, and therefore increase the amount of time required to finish printing.

SUMMARY

An inkjet printer having a suction fan disposed to a platen according to the invention suppresses increasing the length of time required to complete printing while suppressing unnecessary operation of the suction fan.

A control method according to the invention for an inkjet printer that can connect to an external device and has an inkjet head, a platen disposed opposite the inkjet head, and a suction unit disposed to the platen for suctioning recording media positioned on the platen to the platen includes: receiving control data from the external device; and starting operation of the suction fan when a printing-related command relating to preparing to print with the printhead is included in the received control data.

An inkjet printer having a suction unit disposed to a platen according to this configuration of the invention can suppress unnecessary operation of the suction fan while suppressing increasing the time required until printing ends.

In a control method according to another aspect of the invention, the control data is configured with a data end command at the end of the data, and the control method further includes: sequentially storing commands contained in the control data to a receive buffer as the control data is received; sequentially reading the commands stored in the receive buffer; and when a command read from the receive buffer is a printing-related command, starting operation of the suction fan even before reading the data end command.

This configuration uses the data structure of the control data to start operation of the suction fan as soon as it is confirmed that printing will start, and can effectively prevent increasing the time required to complete printing.

A control method according to another aspect of the invention stops operation of the suction fan if the suction fan has started operating but the data end command is not received even though a specific time has past since receiving the control data started, or if a cancel command instructing cancelling a process based on the control data is received before the data end command is received after reception of control data starts.

This configuration can prevent the suction fan from operating unnecessarily.

A printing-related command in another aspect of the invention is a command instructing rendering image data in an image buffer.

This configuration can use the type (a characteristic) of commands contained in the control data to appropriately determine while reading commands contained in the control data whether or not a printing process will be executed.

In another aspect of the invention, the printing-related command is a command instructing rendering image data for at least one of a barcode, graphic, text, or image in the image buffer.

This configuration can use the type (a characteristic) of commands contained in the control data to appropriately determine while reading commands contained in the control data whether or not a printing process will be executed.

A control method according to another aspect of the invention can print images continuously to plural labels of paper having labels affixed with gaps therebetween to a continuous sheet by the inkjet head; the images printed continuously to the plural labels include a static image of content that does not change from label to label, and a variable image of content that changes on each label; and the printing-related command is a command instructing rendering image data related to a static image or a variable image in the image buffer.

This configuration can use the type (a characteristic) of commands contained in the control data to appropriately determine while reading commands contained in the control data whether or not a printing process will be executed.

If operation of the suction fan was started, another aspect of the invention stops operation of the suction fan after printing by the inkjet head ends.

This configuration suppresses unnecessary operation of the suction fan.

An inkjet printer according to another aspect of the invention has a communication unit configured to communicate with an external device; an inkjet head; a platen disposed opposite the inkjet head; a suction unit disposed to the platen for suctioning recording media positioned on the platen to the platen; and a control unit configured to receive control data from the external device by the communication unit, and start operation of the suction fan when a printing-related command related to preparing to print with the printhead is included in the received control data.

An inkjet printer having a suction unit disposed to a platen in this aspect of the invention can suppress unnecessary operation of the suction fan while suppressing increasing the time required for printing to end.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 9A, 9B1, 9B2, 9C1 and 9C2 describe static image control data and variable image control data.

FIGS. 10A and 10B show a flowchart of the operation of the inkjet printer.

DESCRIPTION OF EMBODIMENTS

A preferred embodiment of the present invention is described below with reference to the accompanying figures.

Figure 1:
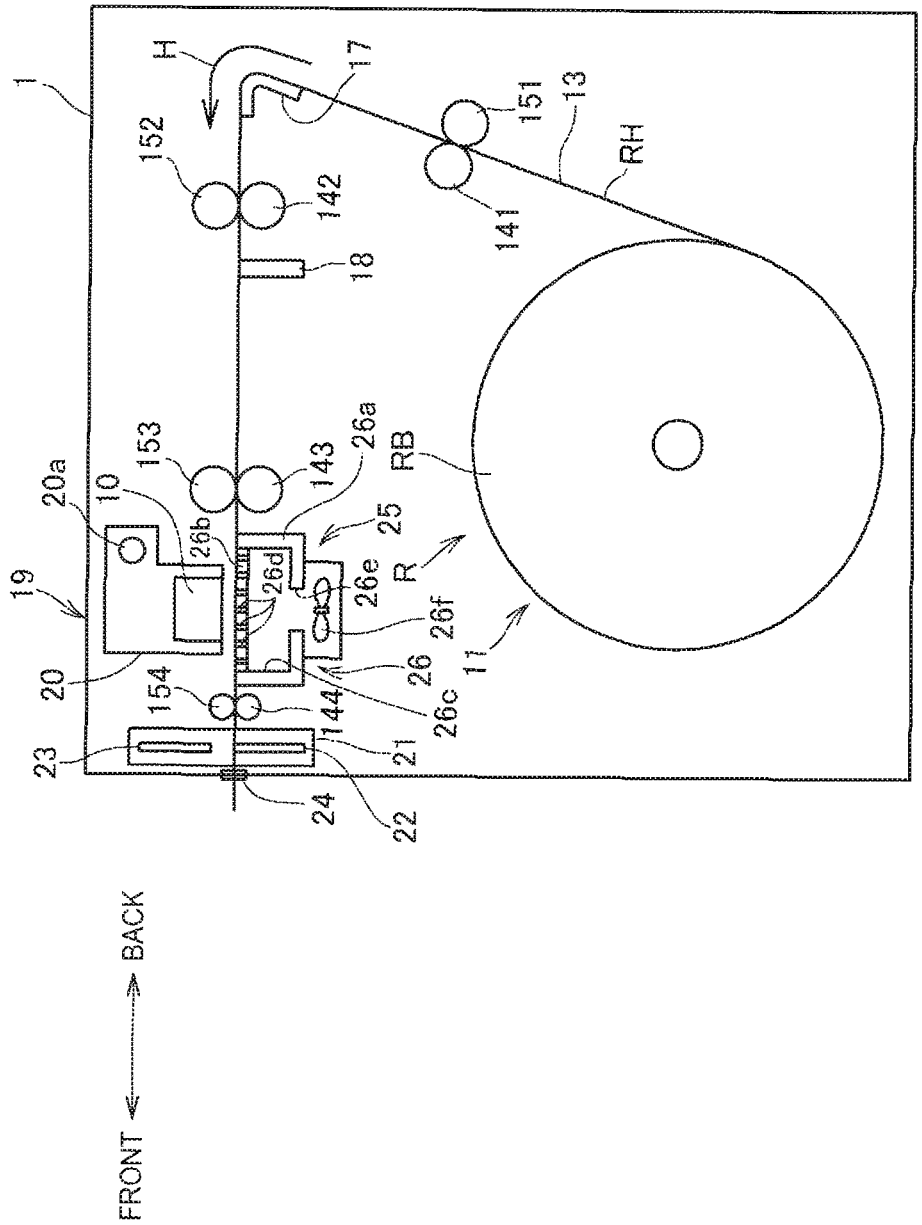
FIG. 1 illustrates the configuration of an inkjet printer according to the invention.

FIG. 1 illustrates the configuration of main components of an inkjet printer 1 according to this embodiment of the invention.

In the following description referring to FIG. 1, the direction between the front and back of the printer is indicated by the arrow in FIG. 1.

The inkjet printer 1 that stores roll paper R (recording media) inside, conveys the stored roll paper R in the conveyance direction H, and prints images by ejecting ink onto the roll paper R by an inkjet head 10, which in this example is a serial head.

Figure 2:
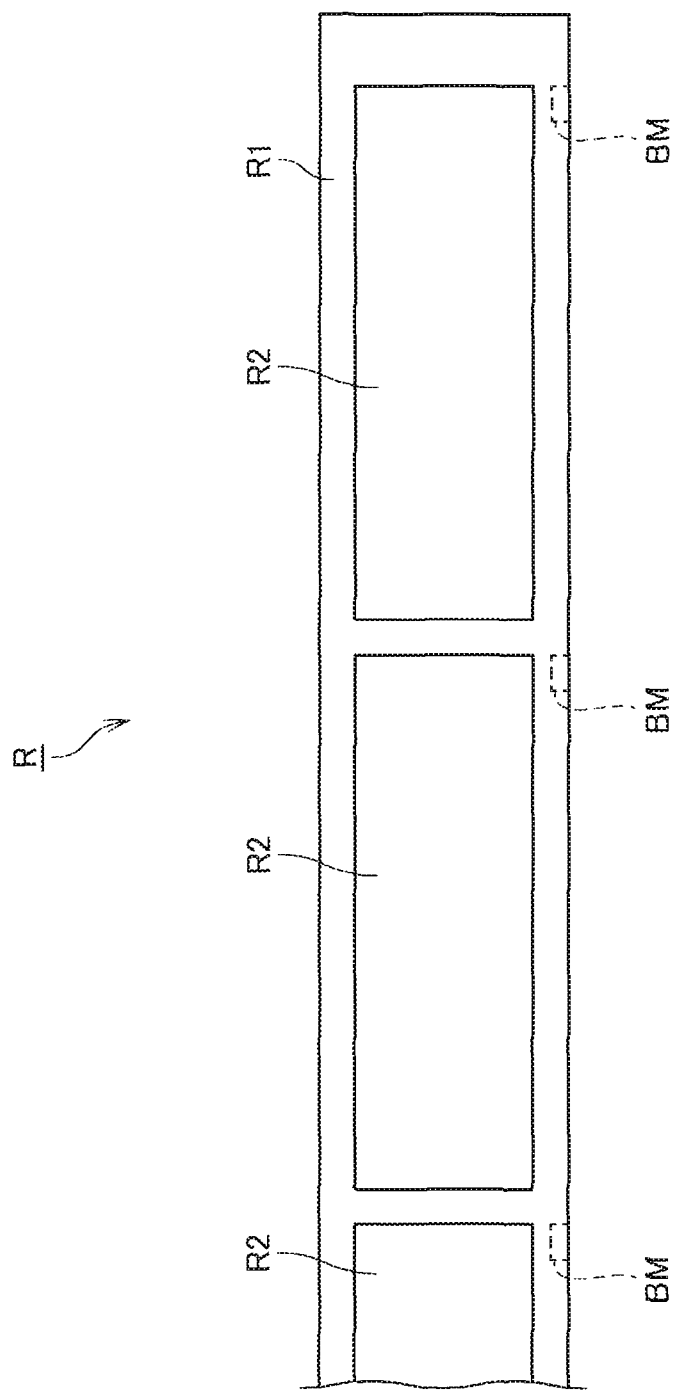
FIG. 2 shows an example of roll paper.

FIG. 2 shows an example of roll paper R used in the inkjet printer 1.

The roll paper R shown in FIG. 2 is label paper (paper) having multiple labels R2 affixed with gaps therebetween to a continuous liner R1 (sheet). The back side of the labels R2 is adhesive, and the labels R2 can be peeled from the liner R1 along the label edges. The length of the long side of the labels R2 is constant, and the gap between adjacent labels R2 is constant.

The area corresponding to the labels R2 is the area where images are printed (area where dots can be formed) on the roll paper R. The inkjet printer 1 forms dots on the labels R2 with the inkjet head 10 to print images by combinations of dots.

As shown in FIG. 2, black marks BM, which are black indexing marks, are formed appropriately to each label R2 on the back side of the roll paper R.

The inkjet printer 1 prints continuously to multiple labels R2 as controlled by the host computer 3 (external device) described below.

As shown in FIG. 1, the inkjet printer 1 has a roll paper compartment 11 in which roll paper R is stored. Note that the portion of the roll paper R stored in a roll inside the roll paper compartment 11 is referred to below as the paper roll RB, and the portion of the roll paper R that is delivered and conveyed from the paper roll RB in the roll paper compartment 11 is referred to below as the conveyed roll paper RH.

As shown in FIG. 1, the inkjet printer 1 has a conveyance path 13, which is the path through which the conveyed roll paper RH is conveyed. The conveyed roll paper RH delivered from the paper roll RB is conveyed in the conveyance direction H through the conveyance path 13.

As shown in FIG. 1, there are four conveyance rollers 141, 142, 143, 144 disposed to the conveyance path 13 from the upstream side to the downstream side in the conveyance direction H. A driven roller 151, 152, 153, 154 that turns in conjunction with rotation of the matching conveyance rollers 141, 142, 143, 144 is disposed opposite each conveyance roller 141, 142, 143, 144. The conveyed roll paper RH is held between the conveyance rollers 141, 142, 143, 144 and the driven rollers 151, 152, 153, 154, and is conveyed in the conveyance direction H with rotation of the conveyance rollers 141, 142, 143, 144. The conveyance rollers 141, 142, 143, 144 are connected to a conveyance motor through a power transfer mechanism, and rotate as driven by the conveyance motor.

As shown in FIG. 1, a guide member 17 is disposed downstream in the conveyance direction H from conveyance roller 141. The guide member 17 contacts the back side of the conveyed roll paper RH, and as the conveyed roll paper RH is conveyed downstream, the conveyed roll paper RH contacts and curves around the guide member 17 toward the front. The guide member 17 contacts the curved part of the conveyed roll paper RH, applies tension to the conveyed roll paper RH, and suppresses slack in the conveyed roll paper RH.

A black mark sensor 18 is disposed downstream in the conveyance direction H from the guide member 17. The black mark sensor 18 optically detects black marks BM formed on the back of the roll paper R. A controller 30 (FIG. 3) detects when a black mark BM is at the detection position of the sensor based on the output from the black mark sensor 18. The controller 30 manages the position of the conveyed roll paper RH based on the output of the black mark sensor 18.

A print unit 19 is disposed downstream in the conveyance direction H from the black mark sensor 18.

The print unit 19 includes a carriage 20 and an inkjet head 10 carried on the carriage 20.

The carriage 20 is supported by a carriage rail 20a parallel to the scanning direction Y (FIG. 5) crosswise to the conveyance direction H, and carries the inkjet head 10 in the scanning direction Y along the carriage rail 20a.

The inkjet head 10 has multiple nozzle rows for different colors of ink (such as four colors, CMYK). The inkjet head 10 discharges ink supplied from ink cartridges not shown from selected nozzles in the nozzle rows to form dots on the conveyed roll paper RH and print images.

A platen 25 is opposite the inkjet head 10. The conveyance path 13 passes and the conveyed roll paper RH is conveyed between the platen 25 and inkjet head 10. The platen 25 covers the area where dots can be formed by the inkjet head 10, and supports the conveyed roll paper RH so that the surface of the conveyed roll paper RH at the platen 25 is perpendicular to the direction in which ink is ejected from the inkjet head 10.

The platen 25 also has a plurality of suction holes 25a. The suction holes 25a pass through the platen 25 in the thickness direction, and are disposed throughout the area of the platen 25. The suction unit 26 described below produces negative pressure in the area of the suction holes 25a, and pulls the conveyed roll paper RH to the platen.

The suction unit 26 has a box-like support stand 26a that is open at the top. The platen 25 is attached to the opening to the support stand 26a. Disposed to the bottom of the support stand 26a is an exhaust vent 26e that passes through the bottom, and a suction fan 26f is connected to the exhaust vent 26e. The suction fan 26f turns and expels air from the vacuum chamber 26c.

The suction unit 26 produces negative pressure in the suction holes 25a by expelling air from inside the vacuum chamber 26c with the suction fan 26f. Suction is thus applied to the conveyed roll paper RH positioned over the suction holes 25a through which negative pressure is produced, and the conveyed roll paper RH is pulled to the platen 25. As a result, the conveyed roll paper RH lays flat on the surface of the platen 25.

A cutter unit 21 (cutter) is disposed downstream in the conveyance direction H from the print unit 19. The cutter unit 21 includes a fixed knife 22 and a movable knife 23 that moves across the fixed knife 22. The cutter unit 21 cuts the conveyed roll paper RH by moving the movable knife 23.

A paper exit 24 is disposed downstream in the conveyance direction H from the cutter unit 21. The conveyed roll paper RH is discharged through the paper exit 24 to the outside of the inkjet printer 1 cabinet.

Figure 3:
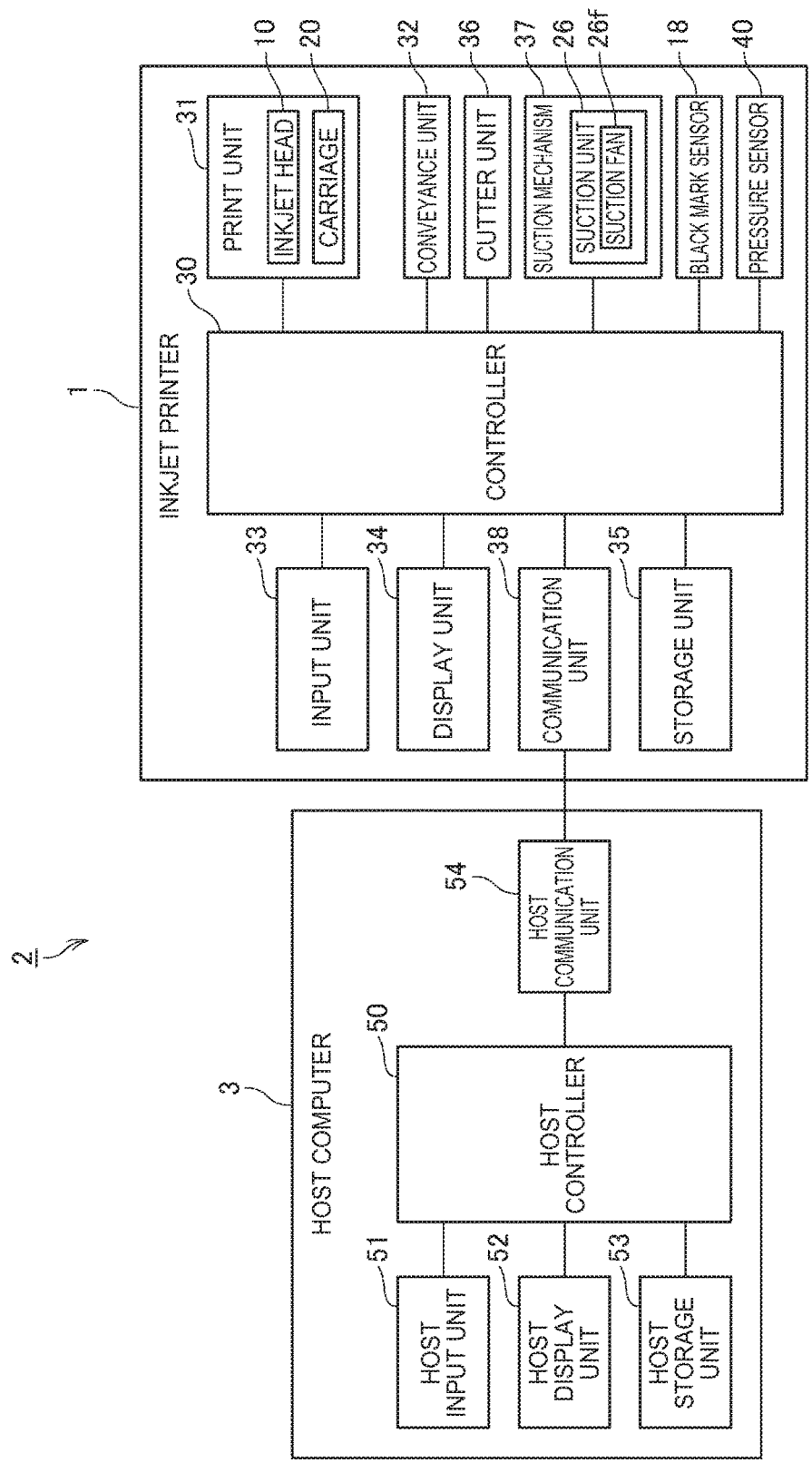
FIG. 3 illustrates the functional configuration of the host computer and inkjet printer.

FIG. 3 is a block diagram illustrating the functional configuration of a printing system 2 according to this embodiment of the invention.

As shown in FIG. 3, the printing system 2 includes an inkjet printer 1, and a host computer 3 that connects to the inkjet printer 1 and controls the inkjet printer 1.

As shown in FIG. 3, the inkjet printer 1 has a controller 30, print unit 31, conveyance unit 32, input unit 33, display unit 34, storage unit 35, cutter unit 36, suction unit 37, communication unit 38, black mark sensor 18, and pressure sensor 40.

The controller 30 comprises a CPU, ROM, RAM, and other peripheral circuits, and the CPU controls the inkjet printer 1 through hardware and software, such as the CPU reading and running a control program.

The print unit 31 includes the inkjet head 10, a drive circuit that drives the inkjet head 10, the carriage 20, a scanning motor that moves the carriage 20 in the scanning direction Y, a motor driver that drives the scanning motor, and other configurations related to printing on roll paper R, prints images on the roll paper R as controlled by the controller 30.

The conveyance unit 32 includes conveyance rollers 141, 142, 143, 144, driven roller 151, 152, 153, 154, a conveyance motor that drives the conveyance rollers 141, 142, 143, 144, a motor driver that drives the conveyance motor, and other configurations related to conveying the roll paper R, and conveys the roll paper R as controlled by the controller 30.

The input unit 33 includes input means such as operating switches disposed to the inkjet printer 1 and a touch panel, detects operation of the input means, and outputs to the controller 30. The controller 30 executes processes corresponding to the operation of the input means based on input from the input unit 33.

The display unit 34 includes multiple LEDs or a display panel, and reports the condition of the inkjet printer 1 and the occurrence of errors as controlled by the controller 30.

The storage unit 35 has nonvolatile memory such as an EEPROM or hard disk drive, and rewritably stores data.

The cutter unit 36 includes the cutter unit 21 described above, a cutter motor that drives the movable knife 23 of the cutter unit 21, a motor driver that drives the cutter motor, and other configurations related to cutting the roll paper R, and cuts the roll paper R as controlled by the controller 30.

The suction unit 37 includes the suction unit 26 described above, a suction motor that drives the suction fan 26f of the suction unit 26, a motor driver that drives the suction motor, and other configurations related to pulling the roll paper R to the platen 25 by suction, and suctions the roll paper R to the platen 25 as controlled by the controller 30.

The communication unit 38 communicates according to a specific communication protocol with the host computer 3 as controlled by the controller 30.

The black mark sensor 18 outputs a different detection value to the controller 30 according to whether or not a black mark BM is present (is detected) at the position corresponding to the location of the black mark sensor 18. The controller 30 detects if a black mark BM is present or is not present at the position of the sensor based on the detection value input from the black mark sensor 18.

The pressure sensor 40 detects the pressure in the vacuum chamber 26c, and outputs a detection value to the controller 30. Based on the detection value input from the pressure sensor 40, the controller 30 detects the pressure in the vacuum chamber 26c.

As shown in FIG. 3, the host computer 3 has a host controller 50, host input unit 51, host display unit 52, host storage unit 53, and host communication unit 54.

The host controller 50 includes a CPU and controls the host computer 3. The host input unit 51 is connected to input means such as input devices or operating switches, detects operation of the input means, and outputs to the host controller 50. The host display unit 52 has a display panel or other display means, and displays information on the display means as controlled by the host controller 50. The host storage unit 53 stores data. The host communication unit 54 communicates with the inkjet printer 1 according to a specific communication protocol as controlled by the host controller 50.

Figure 4:
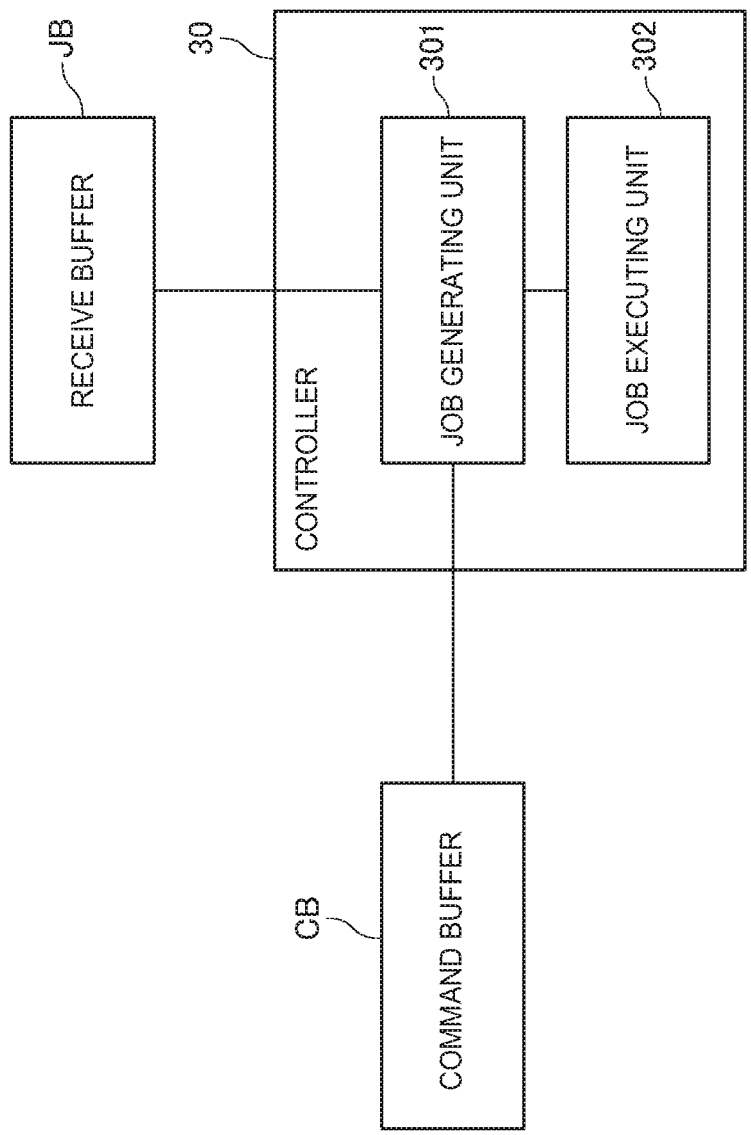
FIG. 4 shows function blocks of the inkjet printer.

FIG. 4 illustrates function blocks of the controller 30 of the inkjet printer 1 and components associated with the function blocks in a format convenient for description. The function blocks of the controller 30 executes processes by the cooperation of hardware and software, such as a CPU reading and running a program.

As shown in FIG. 4, function blocks of the controller 30 of the inkjet printer 1 include a job generating unit 301 and job executing unit 302. The functions and processes based on the functions of these function blocks are described further below.

As also shown in FIG. 4, the job generating unit 301 can read and write data in a receive buffer JB and a command buffer CB. The data stored in the receive buffer JB and command buffer CB is described further below.

The basic operation of the inkjet printer 1 when printing an image to a label R2 of the roll paper R is described next.

FIG. 5 is used to describe the operation of the inkjet head 10 when printing an image on a label R2 of the roll paper R.

Figure 5A:
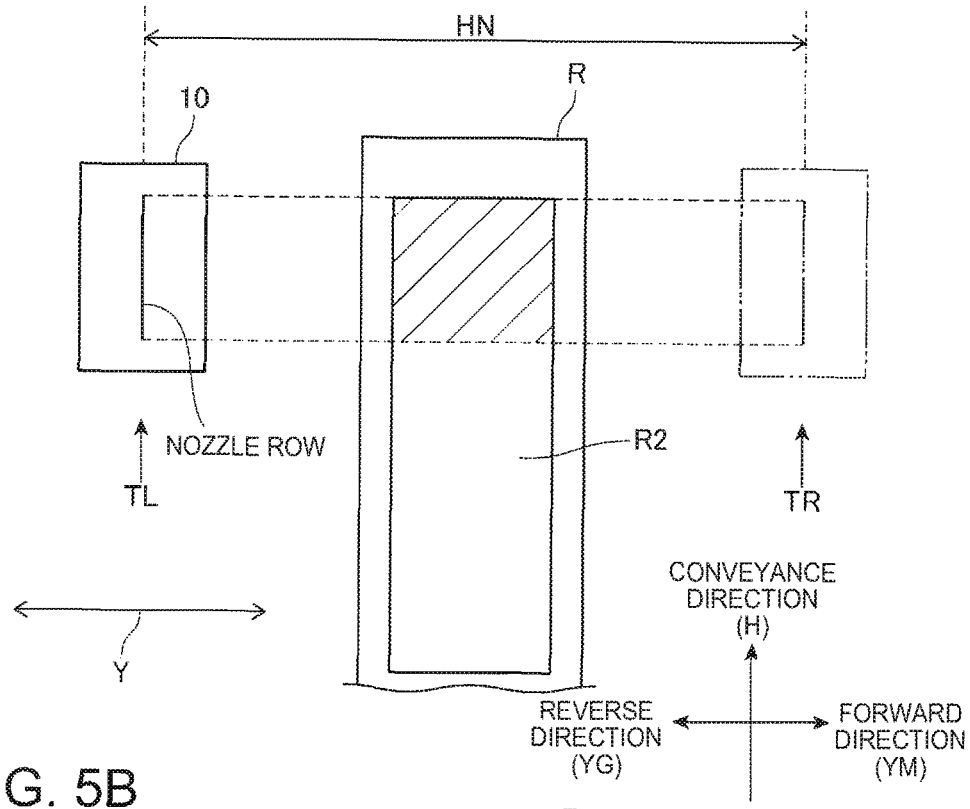
FIGS. 5A and 5B show the process of printing by the inkjet printer.

When printing an image on a label R2, the inkjet head 10 moves in the scanning direction Y and scans the range HN shown in FIG. 5A. Below, the position of the left edge of the range HN as seen in the figure is referred to as position TL, and the position at the right edge is referred to as position TR. The direction of the inkjet head 10 when moving in the scanning direction Y from position TL to position TR (to the right as seen in the figure) is referred to as the forward direction YM, and the direction from position TR to position TL (to the left as seen in the figure) is referred to as reverse direction YG.

The nozzle rows of the inkjet head 10 are formed in the direction aligned with the conveyance direction H.

When printing has stopped, the inkjet head 10 is set to a home position not shown and capped.

When the inkjet head 10 is at position TL as shown in FIG. 5 (A), the relationship between the location of the inkjet head 10 and the position of the label R2 is as shown in FIG. 5A. To print an image on the label R2, the inkjet head 10 scans in the forward direction YM and moves from position TL to position TR. While scanning in the forward direction YM, the inkjet head 10 ejects the appropriate amount of ink from the appropriate nozzles at the appropriate timing to form on the label R2 the dots rendering the image to be printed on the label R2.

As a result, dots configuring the printed image are formed on the label R2 in an area of a length in the conveyance direction H equal to the length of the nozzle rows of the inkjet head 10 (the area shaded with lines descending to the left in FIG. 5A).

Figure 5B:
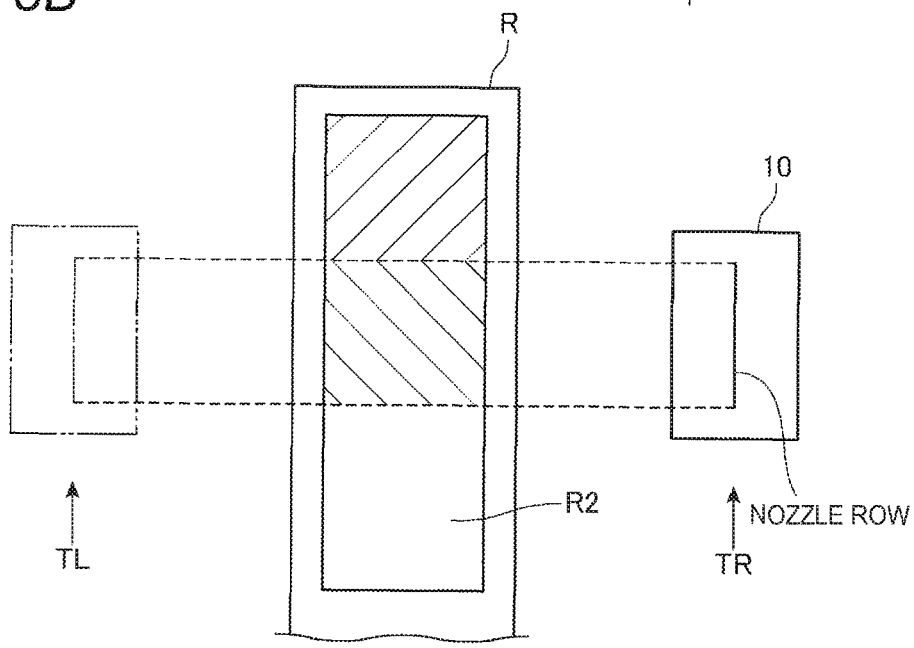

As shown in FIG. 5B, after the inkjet head 10 reaches position TR, the roll paper R is conveyed in the conveyance direction H a distance corresponding to the length of the nozzle rows of the inkjet head 10 as controlled by the controller 30.

Next, the inkjet head 10 scans in the reverse direction YG, and moves from position TR to position TL. While scanning in the reverse direction YG, the inkjet head 10 ejects the appropriate amount of ink from the appropriate nozzles at the appropriate timing to form on the label R2 the dots rendering the image to be printed on the label R2.

As a result, dots configuring the printed image are formed on the label R2 in an area of a length in the conveyance direction H equal to the length of the nozzle rows of the inkjet head 10 (the area shaded with lines descending to the right in FIG. 5B).

Images are thus printed on a label R2 by repeating the process of the inkjet head 10 scanning in the forward direction YM from position TL to position TR while ejecting ink and forming dots on the label R2, and the process of the inkjet head 10 scanning in the reverse direction YG from position TR to position TL while ejecting ink and forming dots on the label R2, as many times needed to print an image.

Figures 6A, 6B:
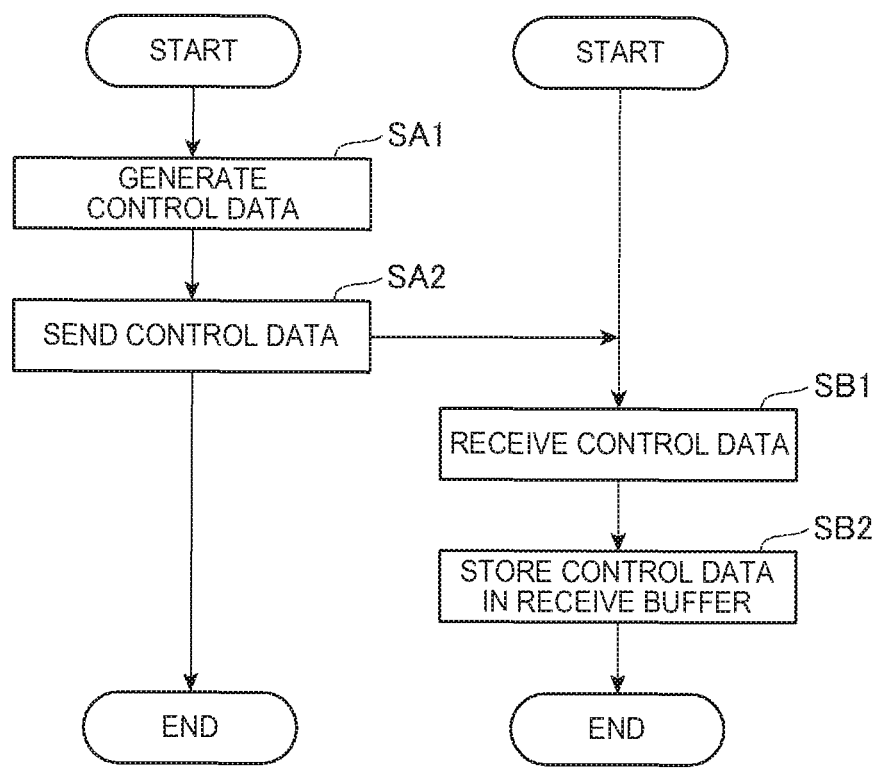
FIGS. 6A and 6B show a flow chart of the operation of the host computer and inkjet printer.

Next, the operation of the host computer 3 and the inkjet printer 1 when the inkjet printer 1 executes a process as controlled by the host computer 3 is described with reference to the flow chart in FIG. 6. In FIG. 6, the operation of the host computer 3 is shown in column (A), and the operation of the inkjet printer 1 in (B).

As shown in FIG. 6 (A), to cause the inkjet printer 1 to execute a specific process, the host controller 50 of the host computer 3 generates control data instructing executing the specific process (step SA1).

There are two types of control data in this embodiment, control data including commands instructing executing a printing-related process (referred to below as printing-related control data), and control data not including commands instructing executing a printing-related process (referred to below as non-printing control data).

The control data contains multiple commands, starts with a data start command CF indicating the beginning of the control data, and ends with an data end command CE indicating the end of the control data.

Figure 7A:
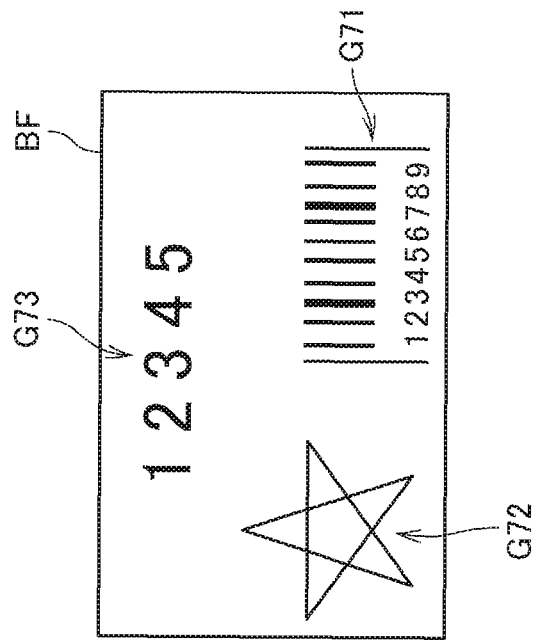
FIGS. 7A and 7B illustrate control data and a buffer in which image data is rendered based on the control data.

FIG. 7A shows an example of printing-related control data instructing printing an image on one label R2.

The printing-related control data shown in the example in FIG. 7A has a data start command CF at the beginning of the data train, and a data end command CE at the end of the data train.

The data start command CF in the printing-related control data shown in the example in FIG. 7A is followed by a create image buffer command C1.

The create image buffer command C1 is a command instructing creating an image buffer BF of a size (number of dots in the direction corresponding to the long side of the label R2, and the number of dots in the direction corresponding to the short side of the label R2) appropriate to the printable area of the label R2 in RAM or other temporary storage area.

Following the create image buffer command C1 in the printing-related control data in the example shown in FIG. 7A is a render barcode image data command C2.

The render barcode image data command C2 is a command instructing rendering the image data representing a barcode (referred to below as barcode image data) in the image buffer BF. The barcode image data includes code information specifying a code of a combination of numbers or other values, information indicating the coordinates corresponding to the location in the image buffer BF for rendering the barcode image data, and information indicating image processes (such as styling) to applied to the barcode image data. Based on the information contained in the render barcode image data command C2, the controller 30 renders the barcode image data in the image buffer BF. A program with functions for generating barcode image data for the code indicated by the code information based on the code information and other information in the render barcode image data command C2 is installed on the inkjet printer 1.

Following the render barcode image data command C2 in the printing-related control data in the example shown in FIG. 7A is a render graphic image data command C3.

The render graphic image data command C3 is a command instructing rendering image data for a figure or other graphic element in the image buffer BF. Unlike photographic data described below, graphic image data is bitmap data representing an image by combining different colors of dots arranged in a dot matrix pattern. A render graphic image data command C3 includes graphic image data, and information indicating the coordinates corresponding to the location in the image buffer BF for rendering the graphic image data. Based on the information contained in the render graphic image data command C3, the controller 30 renders the graphic image data in the image buffer BF.

Following the render graphic image data command C3 in the printing-related control data in the example shown in FIG. 7A is a render text data command C4.

The render text data command C4 is a command instructing rendering font data for each character in a specific text string in the image buffer BF. A render text data command C4 includes character code information indicating the character code of each character in the string to print, information indicating the coordinates corresponding to the location in the image buffer BF for rendering the font data of each character in the string to print, and information indicating image processes (such as styling) to applied to the font data. Font data for all characters the inkjet printer 1 can print is previously installed in the inkjet printer 1, and based on the information contained in the render text data command C4, the controller 30 renders the font data in the image buffer BF. The controller 30 of the inkjet printer 1 has a function for converting the character code of each character in the string to print to font data based on the character code information contained in the render text data command C4.

Following the render text data command C4 in the printing-related control data in the example shown in FIG. 7A is a print instruction command CQ.

The print instruction command CQ is a command instructing printing based on the image data rendered in the image buffer BF.

Figure 7B:
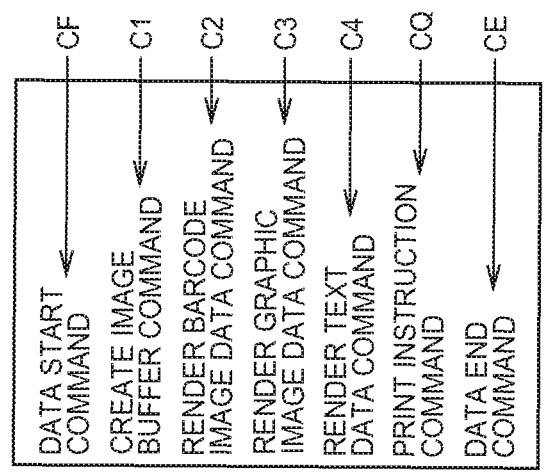

FIG. 7B illustrates image data rendered in the image buffer BF based on the printing-related control data shown in the example in FIG. 7A.

In FIG. 7B, image G71 shows the barcode image data rendered in the image buffer BF based on the render barcode image data command C2. Image G72 shows the graphic image data rendered in the image buffer BF based on the render graphic image data command C3. Image G73 shows font data for the string (in FIG. 7B, the characters in the string 12345) rendered in the image buffer BF based on the render text data command C4. Barcode image data, graphic image data, and image data for text data or other print data related to the images to print on the label R2 are thus rendered in the image buffer BF based on the commands contained in the printing-related control data instructing rendering image data in the image buffer BF.

Figures 8A, 8B:
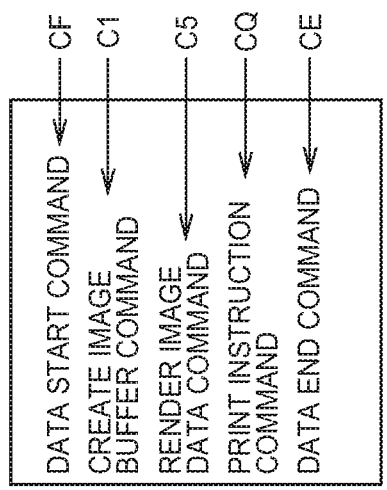
FIGS. 8A and 8B illustrate control data and a buffer in which image data is rendered based on the control data.

FIG. 8A shows another example of printing-related control data instructing printing an image on one label R2.

The printing-related control data shown in the example in FIG. 8A has a data start command CF at the beginning of the data train, and a data end command CE at the end of the data train.

In the printing-related control data shown in the example in FIG. 8A, a create image buffer command C1 follows the data start command CF, and the create image buffer command C1 is followed by a render image data command C5.

The render image data command C5 is a command instructing rendering pictorial image data (image data) for a photograph, drawing, or illustration, for example, in the image buffer BF. This image data is bitmap data for the entire image printed on one label R2. This image data differs from the graphic image data described above in that the graphic image data is not necessarily bitmap data for the entire image printed on one label R2. The render image data command C5 includes the image data for the image printed on the label R2. The controller 30 renders the image data in the image buffer BF based on the information contained in the render image data command C5.

Following the render image data command C5 in the printing-related control data in the example shown in FIG. 8A is the print instruction command CQ.

FIG. 8B illustrates image data rendered in the image buffer BF based on the printing-related control data shown in the example in FIG. 8A.

In FIG. 8B, image G81 shows an example of image data rendered in the image buffer BF based on the render image data command C5. Image data related to the image printed on a label R2 is thus rendered in the image buffer BF based on the render image data command C5 contained in the printing-related control data.

FIG. 9 is used to describe static image control data and variable image control data as examples of printing-related control data.

When continuously printing images to multiple labels R2, the inkjet printer 1 can continuously print an image (referred to below as the label image) comprising an image of content that does not change on each label (referred to below as static images), and images of content that may change from label to label (referred to below as variable images).

FIG. 9A shows an example of a label image printed continuously to multiple labels R2. In the example in FIG. 9A, an image of frame W91 is a static image that does not change from label to label, and the images expressing the numbers printed inside the frame W91 are examples of variable images that change from label to label.

To print a label image continuously to multiple labels R2, the host computer 3 generates and sends static image control data to the inkjet printer 1 before sending the variable image control data described below.

FIG. 9 (B1) shows an example of static image control data.

The static image control data shown in the example in FIG. 9 (B1) starts with a data start command CF and ends with a data end command CE.

In the static image control data in the example shown in FIG. 9 (B1), a continuous printing base information command C6 follows the data start command CF. The continuous printing base information command C6 is a command including such information as the number of labels R2 on which label images are to be printed continuously. The controller 30 controls continuously printing label images based on the continuous printing base information command C6.

In the static image control data in the example shown in FIG. 9 (B1), a create image buffer command C1 follows the continuous printing base information command C6, and a create static image buffer command C7 follows the create image buffer command C1.

The create static image buffer command C7 is a command instructing creating a static image buffer BF1 for rendering image data for static images in a memory area separate from the memory area where the image buffer BF was created.

In the static image control data in the example shown in FIG. 9 (B1), a render static image data command C8 follows the create static image buffer command C7.

The render static image data command C8 is a command instructing rendering image data for the static images (referred to below as static image data) in the static image buffer BF1 described above. The render static image data command C8 includes the static image data and information indicating the coordinates corresponding to the location in the static image buffer BF1 for rendering the static image data. The controller 30 renders the static image data in the static image buffer BF1 based on the static image data and other information contained in the render static image data command C8.

FIG. 9 (B2) illustrates the static image data rendered in the static image buffer BF1 based on the static image control data shown in the example in FIG. 9 (B1). The static image data shown in FIG. 9 (B2) is image data for the static image contained in the label image shown in the example in FIG. 9A. As shown in FIG. 9 (B2), static image data for a static image is rendered in the static image buffer BF1 based on the static image control data.

When continuously printing label images on multiple labels R2, the host computer 3 sends the static image control data as described above, and then sequentially sends variable image control data for each of the labels R2 on which a label image will be printed.

FIG. 9 (C1) shows an example of variable image control data.

The variable image control data shown in FIG. 9 (C1) starts with a data start command CF and ends with a data end command CE.

In the variable image control data in the example shown in FIG. 9 (C1), a render superimposed image command C9 follows the data start command CF. The render superimposed image command C9 is a command including image data for the variable images to be printed (referred to below as variable image data), and instructs rendering the variable image data in a variable image buffer BF2. Because the static image data can be read directly from the static image buffer BF1 when printing a label if static image data is rendered and saved in the static image buffer BF1, the static image data does not need to be received again for each label, and only the variable image data that changes from label to label needs to be received.

The render superimposed image command C9 is a command instructing rendering the variable image data superimposed with the static image data saved in the static image buffer BF1 described above in the image buffer BF. The render superimposed image command C9 includes information related to rendering the variable image data in the variable image buffer BF2, and information indicating the coordinates corresponding to the location in the image buffer BF for rendering the variable image data. The controller 30 renders the variable image data and the static image data superimposed in the image buffer BF based on the render superimposed image command C9.

In the variable image control data in the example shown in FIG. 9 (C1), a print instruction command CQ follows the render superimposed image command C9.

The variable image data and static image data are not necessarily printed superimposed with each other, and in this event are rendered in the image buffer BF without the variable image data being superimposed on the static image data.

If static image data is not used, a create image buffer command and a create variable image buffer command are used instead of the render superimposed image command C9.

The printing-related command may be a command (render superimposed image command C9, create variable image buffer command) instructing superimposing or rendering image data in a buffer (image buffer BF, variable image buffer BF2).

FIG. 9 (C2) shows an example of static image data shown in the example in FIG. 9 (B2) and variable image data related to one of the variable images shown in FIG. 9 (A) rendered in the image buffer BF based on the variable image control data shown in the example in FIG. 9 (C1).

As shown in FIG. 9 (C2), when variable image control data is executed, static image data and variable image data are rendered superimposed in the image buffer BF, and printing proceeds based on the image data rendered in the image buffer BF. As a result, a label image comprising both a static image and a variable image is printed on the corresponding label R2.

Four examples of printing-related control data are described above, but the content of the printing-related control data is not limited thereto.

As described above, the non-printing control data does not contain commands instructing executing a printing-related process. Like the printing-related control data, non-printing control data starts with a data start command CF and ends with a data end command CE. However, the non-printing control data does not have a command instructing rendering image data in a buffer (image buffer BF or static image buffer BF1) between the data start command CF and data end command CE, and includes commands related to processes the inkjet printer 1 is to execute based on the control data.

As shown in FIG. 6 (A), after generating control data in step SA1, the host controller 50 of the host computer 3 controls the host communication unit 54 to send the generated control data to the inkjet printer 1 (step SA2).

As shown in FIG. 6 (B), the controller 30 of the inkjet printer 1 controls the communication unit 38 to receive the control data (step SB1), Next, the controller 30 stores the received control data in the receive buffer JB (step SB2).

As a result, the commands contained in the control data are sequentially stored in the receive buffer JB as the control data is received.

FIG. 10 is a flow chart of the operation of the job generating unit 301 and job executing unit 302 when executing a process from the receive buffer JB, column (A) showing the operation of the job generating unit 301, and (B) showing the operation of the job executing unit 302.

As shown in FIG. 10 (A), the job generating unit 301 monitors if a command is stored in the receive buffer JB (step SC1).

If a command was stored in the receive buffer JB (step SC1: YES), the job generating unit 301 reads the command that was stored in the receive buffer JB (step SC2). As described above, because the commands contained in the control data are sequentially stored to the receive buffer JB as the control data is received, the commands contained in the control data are sequentially read by the job generating unit 301 as the control data is received by the process of step SC1 and step SC2.

Next, the job generating unit 301 determines if the read command is a data start command CF (step SC3).

If the read command is the data start command CF (step SC3: YES), the job generating unit 301 stores the data start command CF that was read to the command buffer CB (step SC4). After step SC4, the job generating unit 301 goes to step SC1, and monitors for the command following the data start command CF being stored in the receive buffer JB.

If the read command is not the data start command CF (step SC3: NO), the job generating unit 301 determines if the command that was read is the data end command CE (step SC5).

If the read command is the data end command CE (step SC5: YES), the job generating unit 301 stores the read data end command CE to the command buffer CB (step SC6).

Next, the job generating unit 301 creates a job based on the series of commands (=control data) between the data start command CF and the data end command CE in the command buffer CB (step SC7).

A job is a unit of a process executed by the job executing unit 302 described below, and comprises commands that can be interpreted by the job executing unit 302. The job executing unit 302 manages processing by jobs, and executes processes by job unit.

Next, the job generating unit 301 outputs the job created in step SC7 to the job executing unit 302 (step SC8). After step SC8, the job generating unit 301 goes to step SC1.

As shown in FIG. 10 (B), the job executing unit 302 acquires the job output by the job generating unit 301 in step SC8 (step SD1).

Next, the job executing unit 302 executes a process appropriate to the job based on the job acquired in step SD1 (step SD2).

Next, if the job is a job based on printing-related control data such as shown in the example in FIG. 7A, or printing-related control data as in the example in FIG. 8A, the job executing unit 302 renders image data in the image buffer BF, and prints images as controlled by the print unit 31 based on the image data rendered in the image buffer BF by executing the job.

In another example, if the job is based on static image control data such as shown in the example in FIG. 9 (B1), the job executing unit 302 renders static image data in the static image buffer BF1 by executing the job.

In another example, if the job is based on variable image control data such as shown in the example in FIG. 9 (C1), the job executing unit 302 renders static image data superimposed with the variable image data in the image buffer BF, and prints a label image comprising a static image and a variable image based on the image data rendered in the image buffer BF by executing the job.

Figure 11:
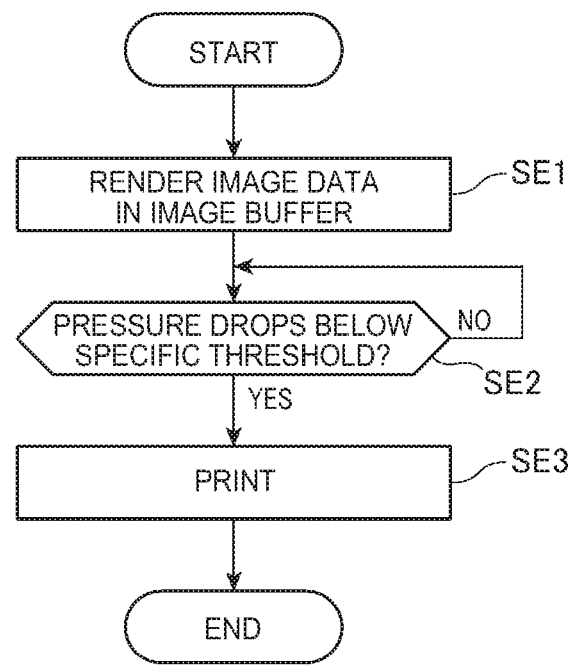
FIG. 11 is a flow chart of the operation of the inkjet printer.

FIG. 11 is a flow chart of the operation of the job executing unit 302 when executing a process (referred to below as a printing process) based on a job (referred to below as a print job) based on printing-related control data involving printing (printing-related control data as in the example shown in FIG. 7A, printing-related control data as in the example shown in FIG. 8A, or variable image control data as in the example shown in FIG. 9 (C1)).

A print job is configured with commands that can be interpreted by the job executing unit 302 so that the process shown in the flow chart in FIG. 11 is executed.

As shown in FIG. 11, the job executing unit 302 renders image data in the image buffer BF (step SE1).

Next, the job executing unit 302 monitors based on the detection value input form the pressure sensor 40 if the pressure in the vacuum chamber 26c has dropped below a specific threshold (step SE2). In other words, if the pressure in the vacuum chamber 26c has not dropped below the specific threshold, the job executing unit 302 waits at step SE2 until the pressure drops.

A certain amount of time is required after the suction fan 26f starts operating (turning) for the pressure in the vacuum chamber 26c to drop below the specific threshold. This is because it takes time for rotation of the suction fan 26f to stabilize at a constant speed, and it takes time for the pressure to decrease to the point where the suction force of the suction fan 26f on the vacuum chamber 26c is stable.

As a result, the sooner the suction fan 26f starts operating before the process of step SE2 starts, the shorter becomes the time spent waiting (standby time; the time required for the pressure in the vacuum chamber 26c to drop below the specific threshold) in step SE2. For example, if the suction fan 26f starts operating enough time before the process of step SE2 starts and the pressure inside the vacuum chamber 26c has decreased below the specific threshold by the time the process of step SE2 starts, the pressure inside the vacuum chamber 26c is quickly determined in step SE2 to be below the specific threshold, and processing proceeds quickly to step SE3.

The longer this standby time becomes, the greater the amount of time required for the inkjet printer 1 to complete printing based on the control data after the host computer 3 sends control data to the inkjet printer 1. As a result, the standby time is as short as possible. As will be understood below, the inkjet printer 1 according to this embodiment suppresses unnecessary operation of the suction fan 26f while also shortening this standby time and keeping the time required to complete printing from becoming long.

When in step SE2 the job executing unit 302 determines the pressure inside the vacuum chamber 26c is below the specific threshold (step SE2: YES), ▯ the job executing unit 302 controls the print unit 31, conveyance unit 32, and other configurations related to printing to print based on the image data rendered in the image buffer BF (step SE3).

As shown in FIG. 10 (A), if in step SC5 the command read in step SC2 is not the data end command CE (step SC5: NO), the job generating unit 301 determines if the read command is a special printing-related command (step SC9).

A special printing-related command is a printing-related command (a command instructing rendering image data in a buffer (image buffer BF or static image buffer BF1)) other than a render superimposed image command C9 contained in variable image control data. In this example, a render barcode image data command C2, render graphic image data command C3, render text data command C4, render image data command C5, and render static image data command C8 are examples of printing-related commands.

If the command read in step SC2 is not a special printing-related command (step SC9: NO), the job generating unit 301 goes to step SC13.

If the command read in step SC2 is a special printing-related command (step SC9: YES), the job generating unit 301 determines if operation of the suction fan 26f started based on a suction job (step SC10).

If operation of the suction fan 26f already started (step SC10: YES), the job generating unit 301 goes to step SC12. Note that if plural special printing-related commands are contained in the control data, and the special printing-related command read in step SC2 is not the first command in the plural special printing-related commands, operation of the suction fan 26f is determined in step SC10 to have already started.

If operation of the suction fan 26f has not already started (step SC10: NO), the job generating unit 301 generates a suction job and outputs the job to the job executing unit 302 (step SC11). The process based on a suction job is described below. After step SC11, the job generating unit 301 goes to step SC12. Note that if plural special printing-related commands are contained in the control data and the special printing-related command read in step SC2 is the first command in the plural special printing-related commands, operation of the suction fan 26f is determined in step SC10 to have not already started.

In step SC12 the job generating unit 301 stores the special printing-related command that was read to the command buffer CB. After step SC12, the job generating unit 301 goes to step SC1.

As described above, when the first special printing-related command contained in the control data is read, the job generating unit 301 in this embodiment generates and outputs a suction job to the job executing unit 302 triggered by reading the special printing-related command before reading a data end command.

As shown in FIG. 10 (B), the job executing unit 302 acquires the suction job output by the job generating unit 301 in step SC10 (step SD3).

Next, the job executing unit 302 executes the suction process by executing the acquired suction job (step SD4).

Figure 12:
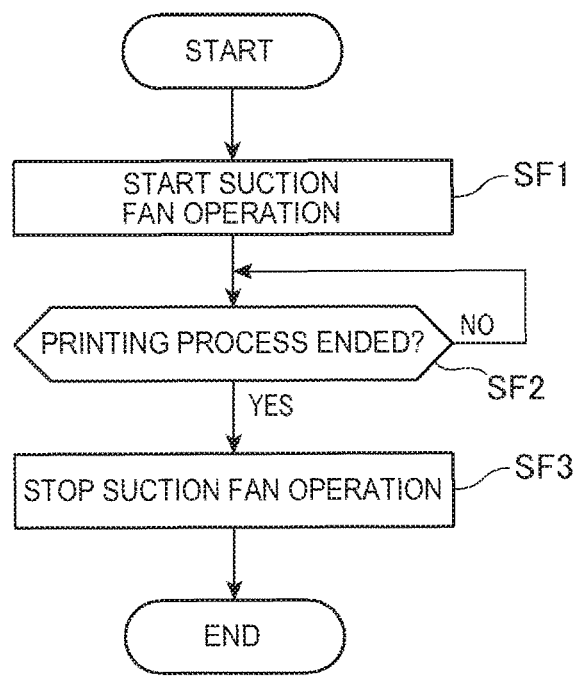
FIG. 12 is a flow chart of the operation of the inkjet printer.

FIG. 12 is a flowchart of steps in the suction process. A suction job comprises commands that can be interpreted by the job executing unit 302 so that the process shown in the flow chart in FIG. 12 is executed.

As shown in FIG. 12, in the suction process, the job executing unit 302 controls the suction unit 37 to start operating the suction fan 26f (step SF1).

In this embodiment, when a special printing-related command is read by the job generating unit 301 in the process of reading commands from the control data, a suction job is created before the data end command CE at the end of the control data is read. In addition, the job executing unit 302 executes a suction process based on the suction job, and the suction fan 26f starts operating. In this embodiment, a print job is created after reading all commands contained in the printing-related control data are read (after the data end command is read). If a special printing-related command is contained in the control data, a printing process based on the control data is expected to execute after image data is rendered in the buffer (image buffer BF or static image buffer BF1). More specifically, by starting the suction fan 26f triggered by the job generating unit 301 reading a special printing-related command, operation of the suction fan 26f can be started as soon as it becomes apparent that a printing process will be executed. Therefore, the standby time (the time required for the pressure in the vacuum chamber 26c to exceed a specific threshold) that occurs between the start and end of the printing process can be shortened.

After the suction fan 26f starts operating in step SF1, the job executing unit 302 monitors if the printing process related to the print job created based on the corresponding control data (control data containing a special printing-related command that triggers generating a print job) has ended (step SF2).

If the printing process ended (step SF2: YES), the job executing unit 302 controls the suction unit 37 to stop the suction fan 26f (step SF3).

Operation of the suction fan 26f thus stops in this embodiment when the printing process ends. The suction fan 26f can therefore be stopped from operating when suctioning recording media is not necessary. Because the time the suction fan 26f is driven is reduced, noise, power consumption, and aging of the suction fan 26f can be suppressed.

As described above, when printing label images continuously to multiple labels R2, the host computer 3 sends static image data followed sequentially by variable image control data for each of the plural labels R2.

In this case, the job executing unit 302 executes the following process in the printing process. Specifically, the job executing unit 302 starts suction fan 26f operation based on the suction job triggered by reading a render static image data command C8 contained in static image control data. In step SF2, the job executing unit 302 then monitors for completion of printing label images on all of the labels R2 based on all of the received variable image control data. The job executing unit 302 stops operation of the suction fan 26f (step SE3) when it determines that printing label images on all labels R2 was completed (step SF2: YES). The reason for this process is described below.

A render static image data command C8 being read indicates that label images will be printed continuously. By starting the suction fan 26f triggered by reading a render static image data command C8, the standby time described above can be shortened. In addition, by stopping the suction fan 26f after printing all label images is completed, the suction fan 26f can be prevented from stopping during continuous printing of label images to plural labels R2, and a delay can be prevented from occurring during continuous printing of label images to plural labels R2.

As shown in FIG. 10 (A), in step SC13 the job generating unit 301 determines if the command read in step SC2 is a cancel command (described below).

If the read command is not a cancel command (step SC13: NO), the job generating unit 301 stores the read command in the command buffer CB (step SC14), and goes to step SC1.

If the read command is a cancel command (step SC13: YES), the job generating unit 301 generates and outputs a cancel job to the job executing unit 302 (step SC15). After step SC15, the job generating unit 301 returns to step SC1. The cancel job process is described below.

As shown in FIG. 10 (B), the job executing unit 302 acquires the cancel job the job generating unit 301 output in step SC15 (step SD5).

Next, the job executing unit 302 executes the cancel process based on the cancel job (step SD6). The cancel process is a process of stopping (cancelling) the process based on the job that is executing. For example, if a printing process is executing, the cancel process stops the printing process. More specifically, if the suction fan 26f is being operated in conjunction with a printing process, the job executing unit 302 stops operating the suction fan 26f in the cancel process. As a result, the suction fan 26f can be prevented from continuing to run when the printing process is stopped by a cancel command.

Other processes of the job generating unit 301 and job executing unit 302 are described next.

The job generating unit 301 executes the process described below if a data end command CE is not read even though a specific time has past since the data start command CF was read, that is, if a data end command is not received within a specific time after receiving control data starts. More specifically, the job generating unit 301 generates and outputs to the job executing unit 302 an error handling job based on the possibility that a communication-related error or other error occurred.

By executing the error handling job, the job executing unit 302 executes a process appropriate to the error, such as reporting to the host computer 3 or reporting to the user. More specifically, if operation of the suction fan 26f was started triggered by reading a special printing-related command, the job executing unit 302 stops the suction fan 26f in the error handling job. As a result, the suction fan 26f can be prevented from continuing to run when an error occurs.

As described above, a inkjet printer 1 according to this embodiment receives control data from a host computer 3 (external device), and starts operating the suction fan 26f if a printing-related command related to preparing to print with the inkjet head 10 is contained in the received control data.

This configuration stops operation of the suction fan 26f when not printing, starts operation of the suction fan 26f when it is determined that printing will start, and can therefore suppress unnecessary operation of the suction fan while also preventing increasing the time until printing ends.

In this embodiment, the inkjet printer 1 sequentially stores commands contained in control data to a receive buffer JB as the control data is received, sequentially reads the commands stored in the receive buffer JB, and when the command read from the receive buffer JB is a printing-related command, starts operation of the suction fan 26f even if the data end command CE has not been read.

This configuration uses the data structure of the control data to start operation of the suction fan 26f as soon as it is confirmed that printing will start, and can effectively prevent increasing the time required to complete printing.

The inkjet printer 1 in this embodiment stops operation of the suction fan 26f if the suction fan 26f has started operating but the data end command CE has not been received even though a specific time has past since receiving the control data started, or a cancel command instructing cancelling the process based on the control data is received after reception of control data starts and before the data end command is received.

This configuration can prevent the suction fan 26f from operating unnecessarily.

A printing-related command in this embodiment is a command instructing rendering image data in a buffer (image buffer BF, static image buffer BF1).

Another example of a printing-related command in this embodiment is a command instructing rendering or superimposing image data in a buffer (image buffer BF, variable image buffer BF2).

This configuration can use the type (characteristic) of commands contained in the control data to appropriately determine while reading commands contained in the control data whether or not a printing process will be executed.

Another example of a printing-related command in this embodiment is a command instructing rendering image data for at least one of a barcode, graphic, text, or image in the image buffer BF.

This configuration can use the type (characteristic) of commands contained in the control data to appropriately determine while reading commands contained in the control data whether or not a printing process will be executed.

Another example of a printing-related command in this embodiment is a command instructing rendering image data for a static image in the static image buffer BF1.

This configuration can use the type (characteristic) of commands contained in the control data to appropriately determine while reading commands contained in the control data whether or not a printing process will be executed.

When operation of the suction fan 26f was started, this embodiment of the invention stops operation of the suction fan 26f after printing with the inkjet head 10 ends.

This configuration can prevent the suction fan 26f from operating unnecessarily.

The invention is described above with reference to a preferred embodiment thereof, but the invention is not limited thereto and can be modified and adapted in many ways without departing from the scope of the accompanying claims.

For example, the embodiment described above uses the example of a inkjet printer 1 printing on paper having affixed labels. The recording medium on which the inkjet printer 1 prints is not limited to such recording media, however.

A printing-related command may also be any command related to preparing to print that also enables determining that a process involving printing will execute later. A printing-related command can obviously also be a print instruction command CQ or data end command CE.

The function blocks described above with reference to the figures can be embodied as desired by the cooperation of hardware and software, and do not suggest a specific hardware configuration.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A control method for an inkjet printer configured to connect to an external device, the control method comprising:
   providing an inkjet printer comprising:
      an inkjet head,
      a platen comprising suction holes disposed opposite the inkjet head, and
      a suction fan configured to rotate to apply suction to a recording medium positioned over the suction holes;
   receiving control data from the external device;
   sequentially storing commands contained in the received control data to a receive buffer, the commands including a data end command at an end of the control data;
   sequentially reading the commands stored in the receive buffer; and
   when a command read from the receive buffer is a printing-related command instructing rendering image data in an image buffer, starting operation of the suction fan before reading the data end command.

2. The control method of an inkjet printer described in claim 1, further comprising:
   stopping operation of the suction fan if the data end command is not read within a specific time after reading the printing-related command.

3. The control method of an inkjet printer described in claim 1, further comprising:
   stopping operation of the suction fan when a cancel command instructing cancelling a process based on the control data is received after reading the printing-related command and before reading the data end command.

4. The control method of an inkjet printer described in claim 3,
   wherein the printing-related command is a command instructing rendering image data for at least one of a barcode, graphic, text, or image in the image buffer.

5. The control method of an inkjet printer described in claim 3, wherein:
   the inkjet printer is configured to print on plural labels affixed with a gap therebetween to a continuous sheet, based on image data rendering with a static image of content that does not change on each label superimposed with a variable image of content that changes on each label; and
   the printing-related command is a command instructing rendering image data related to the static image to the image buffer.

6. The control method of an inkjet printer described in claim 1, further comprising:
   if operation of the suction fan was started, stopping operation of the suction fan after printing by the inkjet head ends.

7. An inkjet printer comprising:
   a communication unit configured to communicate with an external device;
   an inkjet head;
   a platen comprising suction holes disposed opposite the inkjet head;
   a suction fan configured to rotate to apply suction power to a recording medium positioned over the suction holes; and
   a control unit configured to:
      receive control data from the external device via the communication unit,
      sequentially store commands contained in the received control data to a receive buffer, the commands including a data end command at an end of the control data;
      sequentially read the commands stored in the receive buffer, and
      when a command read from the receive buffer is a printing-related command instructing rendering image data in an image buffer, start operation of the suction fan before reading the data end command.

8. The inkjet printer described in claim 7, wherein the control unit is further configured to stop operation of the suction fan if the data end command is not read within a specific time after reading the printing-related command.

9. The inkjet printer described in claim 7, wherein the control unit is further configured to stop operation of the suction fan when a cancel command instructing cancelling a process based on the control data is received after reading the printing-related command and before reading the data end command.

10. The inkjet printer described in claim 7, wherein the printing-related command is a command instructing rendering image data for at least one of a barcode, graphic, text, or image in the image buffer.

11. The inkjet printer described in claim 7, wherein:
the inkjet printer is configured to print on plural labels affixed with a gap therebetween to a continuous sheet, based on image data rendering with a static image of content that does not change on each label superimposed with a variable image of content that changes on each label; and
the printing-related command is a command instructing rendering image data related to the static image to the image buffer.

12. The inkjet printer described in claim 7, wherein the control unit is further configured to, if operation of the suction fan was started, stop operation of the suction fan after printing by the inkjet head ends.

* * * * *